May 13, 1952 D. L. ARENBERG 2,596,460

MULTICHANNEL FILTER

Filed April 5, 1946

INVENTOR.

DAVID L. ARENBERG

BY M. A. Hayes

ATTORNEY

Patented May 13, 1952 2,596,460

UNITED STATES PATENT OFFICE 2,596,460

MULTICHANNEL FILTER

David L. Arenberg, Rochester, Mass., assignor, by mesne assignments, to the United States of America as represented by the Secretary of the Navy Application April 5, 1946, Serial No. 659,997

10 Claims. (Cl. 178—44)

This invention relates to electrical communication systems and more specifically to a multichannel filter for communication systems.

The object of this invention is to provide a filter permitting the selection of a communication channel from a multiplicity of channels.

Another object is to provide a communication signal filter using a supersonic resonator.

To accomplish these objects an electric signal filter has been invented using a supersonic resonator as the frequency sensitive element. When sound energy is sent into a medium having little attenuation, resonance occurs at certain frequencies. The lowest frequency at which resonance occurs is known as the fundamental frequency and is determined by the dimensions of the medium and the velocity of sound in the medium. It is possible to excite resonance at many multiples, known as harmonics, of this fundamental frequency. The harmonic frequencies are evenly spaced, being separated by an interval equal to the fundamental frequency. If the attenuation is very low, resonance may be excited at harmonic frequencies as high as the 3000th harmonic. Thus, a multiplicity of evenly and closely spaced resonance points are obtained.

Electric signals may be transformed into sound energy or vice versa, by a crystal having piezo-electric properties. A filter for electric signals may be designed using piezo-electric crystals and a supersonic resonator. The electric signal may be converted to a supersonic signal by a piezo-electric crystal, the supersonic signal projected into a medium having sonic resonant properties, and the supersonic signal reconverted to an electric signal by a piezo-electric crystal. The resonant medium acts as a filter for the signal.

The foregoing and further objects will be more apparent from the following specification when considered with the accompanying drawing in which.

Figure 1:
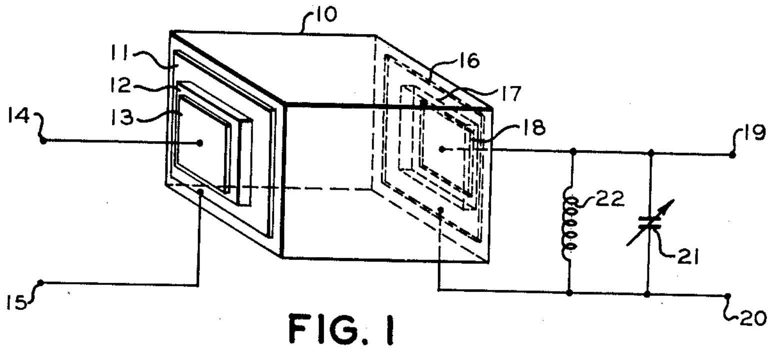
Fig. 1 is a diagram of filter embodying this invention.

Referring now to Fig. 1, a supersonic resonator 10 is formed by a rectangular block of fused quartz. The resonator 10 may be of any material having low supersonic attenuation, such as, fused or crystal quartz, glass, single crystals of certain salts, or metal. The two end faces are polished flat and parallel and coated with layers of conducting material 11 and 16. Piezo-electric crystals 12 and 17 are cemented in the center of the end faces of resonator 10 over the conducting layers 11 and 16. The crystals 12 and 17 are identical and may be X-cut quartz crystals. The sides of crystals 12 and 17 remote from resonator 10 are coated with layers of conducting material 13 and 18. The conducting layers 11, 13, 16, and 18 may be silver. Input terminals 14 and 15 connect to conducting layers 13 and 11 respectively. Output terminals 19 and 20 connect to conducting layers 18 and 16 respectively. Variable capacitor 21 and inductor 22 connect in parallel across output terminals 19 and 20. Input terminal 15 and output terminal 20 may be connected together.

The fundamental frequency of the resonator 10 should be equal to the desired spacing of the signal channels. For example, if channels spaced at 10 kilocycle intervals are desired, the fundamental frequency of the resonator 10 would be 10 kilocycles. The piezo-electric crystals 12 and 17 should be nearly identical and have a resonant frequency higher than the highest signal frequency for which they are to be used. The parallel resonant circuit formed by capacitor 21 and inductor 22 should be capable of being tuned over the frequency range of the desired signal channels.

In operation, the incoming electrical signals, which may be of a frequency of any of the signal channels, will be applied to terminals 14 and 15 and will excite crystal 12. Crystal 12 will convert the electrical signals to sound signals of the same frequency. The sound vibrations in crystal 12 will be transmitted to, and set up sound waves in, resonator 10. The sound waves will be greater in magnitude for any frequency having a harmonic relation to the fundamental frequency of resonator 10. Thus, resonator 10 will discriminate against any frequency not in a signal channel. The sound wave will excite crystal 17 and a voltage will be generated across the output terminals 19 and 20. The magnitude of the output voltage will depend also upon the parallel circuit of capacitor 21 and inductor 22. This parallel circuit shunts crystal 17, so the maximum output voltage will be obtained at the resonant frequency of the parallel circuit. If the parallel circuit is resonant at a harmonic frequency of resonator 10, maximum output will be obtained at that frequency. By tuning the parallel circuit with variable capacitor 21, the system may be made selective to any of the many harmonic frequencies of resonator 10.

Figure 2:
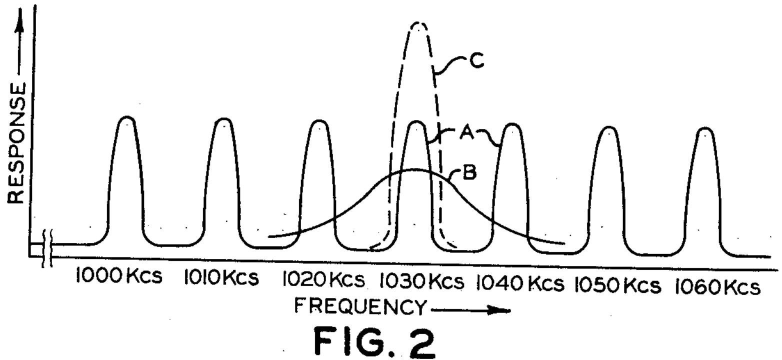
Fig. 2 is a graph of a portion of the filter characteristics.

As an example of how the system might be operated, a response versus frequency curve is shown in Fig. 2. Assuming a fundamental frequency for resonator 10 of 10 kilocycles, harmonics will occur at 10 kilocycle intervals. Signal channels, as illustrated by curve A, will be available at frequencies such as 1000 kcs., 1010 kcs., 1020 kcs., etc. The response of the parallel circuit of capacitor 21 and inductor 22, shown by curve B, may be tuned to any of these channels, say 1030 kcs., as illustrated. The overall response could then be illustrated by curve C. As capacitor 21 is variable, the frequency of the response of the parallel circuit could be varied to allow operation at any of the harmonic frequencies. Capacitor 21 or inductor 22 could be varied in steps by a push-button mechanism to allow selection of any channel. Sharper selectivity would be possible by placing a parallel or series tuned circuit in the input circuit of the filter.

Figure 3:
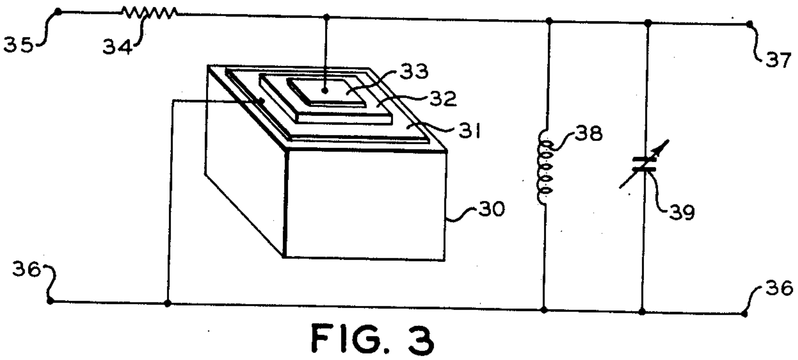
Fig. 3 is a diagram of a second embodiment of the invention.

A second method of using a sonic resonator as a filter is illustrated in Fig. 3. A supersonic resonator 30 is formed by a rectangular block of material having low supersonic attenuation. The material may be any of the materials previously mentioned. Two opposite faces of the resonator 30 are polished flat and parallel. One polished face is coated with a conducting layer 31, such as a silver layer. A piezo-electric crystal 32 is cemented to the center of this conducting layer 31. The remote face of crystal 32 is coated with a conducting layer 33. Thus, the arrangement at one end of resonator 30 is similar to the arrangement at the ends of resonator 10 in Fig. 1. Conducting layer 31 is connected to a common input and output terminal 36. A second input terminal 35 connects through an impedance 34 to conducting layer 33. The impedance 34 may be a resistor or the internal impedance of the signal source. Conducting layer 33 also connects to a second output terminal 37. An inductor 38 and a variable capacitor 39 connect in parallel across output terminals 36 and 37.

In operation of the arrangement shown in Fig. 3, an electric signal is applied at the input terminals 35 and 36. The signal will be applied through impedance 34 to crystal 32 and the parallel circuit of inductor 38 and capacitor 39. Crystal 32 will convert the electrical signal to a sound signal of the same frequency. The sound vibrations in crystal 32 will be transmitted to resonator 30. Sound waves in resonator 30 will be reflected from the opposite face and return to the face on which crystal 32 is mounted. The reflected sound waves will generate an electric signal across crystal 32. When the signal generated by the reflected sound waves is in phase with the applied signal, the electrical impedance of crystal 32 is a maximum. Thus the electrical impedance of crystal 32 will be maximum at any signal frequency having a harmonic relationship to the fundamental frequency of resonator 30. The impedance of the parallel circuit of inductor 38 and capacitor 39 will be maximum at the resonant frequency of the parallel circuit. If the parallel circuit is resonant at a harmonic frequency of resonator 30, the impedance across the combination will be very high. As the signal across the output terminals 36 and 37 depends upon the ratio of impedance 34 to the impedance of the combination of resonator 30, inductance 38, and capacitor 39, the output signal will be maximum when the impedance of the combination is maximum.

The harmonic frequencies of resonator 30 will provide signal channels as shown in Fig. 2, curve A. Capacitor 39 may be varied to allow selection of any of these signal channels. The operation of the filter will be similar to the operation illustrated in the curves of Fig. 2 and discussed previously. The arrangement shown in Fig. 3 has the advantage of simple construction.

Figure 4:
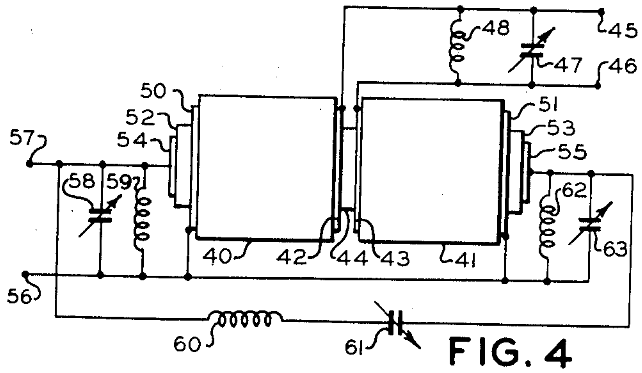
Fig. 4 is a diagram of a third embodiment of the invention.

A third method using two sonic resonators as a filter is shown in Fig. 4. Two resonators 40 and 41 are formed of blocks of material having low sonic attenuation. The end faces of resonators 40 and 41 are polished flat and parallel. On adjacent end faces of resonators 40 and 41 are conducting layers 42 and 43. Cemented between the conducting layers 42 and 43 is a piezo-electric crystal 44. Output terminals 45 and 46 connect to conducting layers 42 and 43 respectively. Across terminals 45 and 46 are connected variable capacitor 47 and inductor 48. On the remote end faces of resonators 40 and 41 are conducting layers 50 and 51 respectively. Cemented to the center of layers 50 and 51 are piezo-electric crystals 52 and 53 respectively. On the remote faces of crystals 52 and 53 are conducting layers 54 and 55 respectively. Conducting layers 50 and 54 are connected to input terminals 56 and 57 respectively. Across terminals 56 and 57 are connected variable capacitor 58 and inductor 59. Connecting from terminal 57 to conducting layer 55 is a series combination of inductor 60 and variable capacitor 61.

Conducting layer 51 is connected to terminal 56. Connected between conducting layers 51 and 55 is a parallel combination of inductor 62 and variable capacitor 63. The construction and composition of the parts are similar to the parts discussed previously.

In operation, an electric signal is applied at terminals 56 and 57. The combination of inductor 59 and capacitor 58 would be tuned to offer the highest impedance to the desired signal frequency. Piezo-electric crystal 52 would be excited and set up sound waves of the signal frequency in resonator 40. The electric signal would also be applied to crystal 53 through the series circuit of inductor 60 and capacitor 61. The parallel circuit of inductor 62 and capacitor 63 would be tuned to offer the highest impedance at the desired signal frequency. Variation of capacitor 61 would permit changing of the phase of the electric signal applied to crystal 53 in respect to the phase of the signal applied to crystal 52. Sound waves would be set up in resonator 41 by the signal on crystal 53. The sound signal impressed on crystal 44 would be the sum of the sound signals in resonators 40 and 41. Crystal 44 would produce an electric signal output across terminals 45 and 46 proportional to the sum of the sound signals. The parallel combination of inductor 48 and capacitor 47 would be tuned to offer highest impedance at the desired signal frequency. The output signal will be filtered by the resonant action of resonators 40 and 41 as discussed previously. Separation between harmonic frequencies will be accomplished by the parallel combination of inductors and capacitors across each crystal. By changing the relative phase of the electric signals applied to crystals 52 and 53, the effective resonant frequencies of resonators 40 and 41 may be changed. Thus, the filter would operate on any frequency, not just the harmonic frequencies of the natural fundamental frequency of resonators 40 and 41.

The filter shown in Fig. 4, and described above, will be very selective and have a wide frequency range. The two resonators 40 and 41 may be considered as one resonator divided in the center with a crystal inserted between the halves. The input may also be applied to terminals 45 and 46 and output obtained at terminals 56 and 57. This arrangement will effectively double the fundamental resonant frequency of the resonators 40 and 41, which will double the separation between harmonic frequencies. Also, because of the symmetrical loading on crystal 44, undesirable transverse modes of resonance in resonators 40 and 41 will be reduced.

It is understood that the invention is not to be limited by the details of construction and operation illustrated and described above except as appears hereafter in the claims.

What is claimed is:

1. An electrical signal filter comprising, a solid supersonic resonator of material having low supersonic attenuation, said supersonic resonator having two flat and parallel faces and being responsive to a predetermined supersonic frequency and harmonics thereof, means responsive to electrical signals for applying supersonic signals to said supersonic resonator, means responsive to supersonic signals transmitted by said supersonic resonator for generating electrical signals, an electric circuit filter, and means for tuning said filter over a band which includes a plurality of harmonic frequencies of said supersonic resonator.

2. A filter for electrical signals comprising, a solid supersonic resonator of material having low supersonic attenuation, said supersonic resonator having two flat and parallel faces and being responsive to a predetermined supersonic frequency and harmonics thereof, a piezo-electric crystal mounted between two layers of conducting material, one of said conducting layers adjoining one of said faces of said supersonic resonator, a source of electrical signals having an impedance, said source of electrical signals connected to said conducting layers, and a parallel resonant electric circuit tunable to be responsive to a frequency of one harmonic of said supersonic resonator, said electric circuit being connected to said conducting layers.

3. A filter for electrical signals comprising, a solid supersonic resonator of material having low supersonic attenuation, said supersonic resonator having two flat and parallel faces and being responsive to a predetermined supersonic frequency and harmonics thereof, a first piezo-electric crystal mounted between two layers of conducting material, one of said conducting layers adjoining one of said faces of said supersonic resonator, a second piezo-electric crystal mounted similar to said first crystal and adjoining the opposite face of said supersonic resonator, a source of electrical signals connected to said conducting layers on said first crystal, and a tunable parallel resonant electric circuit responsive to a frequency of one harmonic of said supersonic resonator, said electric circuit connected to the conducting layers on said second crystal.

4. A filter for electrical signals comprising, first and second solid supersonic resonators of material having low supersonic attenuation, each of said supersonic resonators having two flat and parallel faces and being responsive to a predetermined supersonic frequency and harmonics thereof, a first piezo-electric crystal mounted between first and second layers of conducting material, said first and second conducting layers adjoining faces of said first and second resonators respectively, a first tunable parallel resonant electric circuit connected to said first and second conducting layers, a second piezo-electric crystal mounted between a third and fourth conducting layer, said third conducting layer adjoining a face of said first resonator opposite to said first crystal, a source of electric signals connected to said third and fourth conducting layers, a second tunable parallel resonant electric circuit connected to said third and fourth conducting layers, a third piezo-electric crystal mounted between a fifth and sixth layer of conducting material, said fifth conducting layer adjoining a face of said second resonator opposite to said first crystal, a third tunable parallel resonant electric circuit connected to said fifth and sixth conducting layers, and a tunable series resonant electrical circuit, said fifth and sixth conducting layers connected to said source of electrical signals through said series resonant electrical circuit.

5. A filter for electrical signals comprising, a solid cubical resonator of material having low supersonic attenuation, means for introducing and extracting supersonic energy from said resonator, and a parallel resonant output circuit connected to said means, said circuit being tunable over a band which includes a plurality of harmonics of the resonant frequency of said resonator.

6. A filter for electrical signals comprising, a solid cubical resonator of material having low supersonic attenuation, a first piezoelectric crystal attached to said resonator, means for electrically energizing said first crystal, said first crystal providing supersonic energy to said resonator, a second piezoelectric crystal also attached to said resonator for converting supersonic energy to electrical energy and a parallel resonant output circuit connected to said second crystal, said output circuit being tunable over a band of frequencies which includes a plurality of the harmonics of the resonant frequency of said resonator and the frequency of said electrical signals.

7. A filter for electrical signals comprising, a supersonic resonator formed of a cube of material having low supersonic attenuation, at least two opposite faces of said cube being flat and parallel, conducting layers of material coated on said opposite faces, a piezoelectric crystal attached to one of said layers, means for applying an electrical signal of a first frequency to said crystal whereby said crystal provides a supersonic wave of a second frequency directed across said resonator perpendicular to said parallel faces, said first frequency being a multiple of said second frequency, reflection of said supersonic wave occurring at the other of said parallel faces, said crystal reconverting said reflected supersonic waves to electrical signals, and a parallel resonant output circuit tunable over a band of frequencies which includes a plurality of the harmonics of the resonant frequency of said resonator and the frequency of said electrical signals.

8. A filter for electrical signals comprising, first and second substantially similar cubes of material having low supersonic attenuation, said cubes being disposed adjacent one another and having end surfaces flat and parallel, a conductive layer on each of said end surfaces, a first piezoelectric crystal mounted on the conductive layer on one of said end surfaces of said first cube, a second piezoelectric crystal mounted on the conducting layer on the end surface of said second cube remote from said one of said end surfaces of said first cube, a third piezoelectric crystal disposed between adjacent end surfaces of said first and second cubes and attached to the conductive layers of each of said adjacent surfaces, means for introducing an electrical signal into said first and said second crystals, said third crystal being responsive to a supersonic signal developed in said cubes by said first and second crystals, said third crystal reconverting said supersonic signal to an electrical signal, and means for extracting an electrical signal from said third crystal.

9. Apparatus as in claim 8 wherein said means for introducing an electrical signal to said first and said second crystals comprises parallel resonant tuned circuits, each including a variable capacitor connected in shunt with said first and said second crystals, respectively, and a series resonant tuned circuit including a variable capacitor connected between said first and said second crystals.

10. Apparatus as in claim 8 wherein said means for extracting an electrical signal from said third crystal comprises a parallel resonant tuned circuit including a variable capacitor.

DAVID L. ARENBERG.

REFERENCES CITED

The following references are of record in the file of this patent:

UNITED STATES PATENTS

| Number | Name | Date |
|---|---|---|
| 1,693,806 | Cady | Dec. 4, 1928 |
| 2,342,869 | Kinsley | Feb. 29, 1944 |
| 2,345,491 | Mason | Mar. 28, 1944 |

FOREIGN PATENTS

| Number | Country | Date |
|---|---|---|
| 355,754 | Great Britain | 1931 |